United States Patent Office 3,458,345
Patented July 29, 1969

3,458,345
METHOD OF MAKING GLASS-SILICON COMPOSITE BODIES
Gunther E. Fenner, Schenectady, N.Y., assignor to General Electric Company, a corporation of New York
No Drawing. Filed Sept. 9, 1965, Ser. No. 486,232
Int. Cl. B44d 1/092; C03c 17/02, 17/22
U.S. Cl. 117—70                                    2 Claims

ABSTRACT OF THE DISCLOSURE

A glass-silicon composite body is made by providing a thin layer of silica on a silicon body and then forming a coating of a borosilicate glass onto the silica layer at about 1000° C., and finally cooling the body and freezing the glass coating in place on it.

---

This invention relates generally to glass-silicon seals and more particularly to a novel method of producing glass-silicon articles.

In the use of strain gauges such as the "window frame" strain gauges disclosed and claimed in my copending patent application Ser. No. 104,271, filed Apr. 20, 1961, now Patent No. 3,251,222, and assigned to the assignee hereof, it is necessary to securely bond these gauges to test members. Because of their tendency to creep under conditions of such use, available organic cements are generally not satisfactory for this purpose. Glass would overcome this creeping problem but glasses which match the coefficient of thermal expansion of silicon, the commonly employed strain gauge material, react with silicon with the result that bubbles are formed in the glass and a weak structure is produced. Also, silicon matching glasses are borosilicate glasses and boron tends to diffuse from such glass into the silicon body of the strain gauge, destroying its utility.

I have discovered that at 1000° C. to 1050° C., good strong bonds can be made with certain glass between silicon strain gauges and test members and the glass-silicon reaction can be avoided with certain silicon-matching borosilicate glasses. I have further found that the boron diffusion from these glasses into the silicon body of the gauge can be prevented by providing a thin layer of silica between the silicon body and the glass. Moreover, the strength of the resulting bond between the silicon body and the glass coating and the utility of the final assembly, including the strain gauge and the test member, are not impaired.

Still further, I have discovered that structural strengths desired or required in the strain-gauge test piece assembly can be consistently obtained if the glass has a cofficient of thermal expansion substantially or approximately matching that of the metal substrate body or test piece over the temperature range from 25° C. to 300° C. The glass will preferably not be grossly mismatched in thermal expansion to silicon over this same temperature range. Thus, for example, in accordance with this invention a glass having a coefficient of linear thermal expansion of $36 \times 10^{-7}$ centimeters per centimeter per degree centigrade is used where the substrate body is of tungsten; but where the substrate body is of Kovar, the glass employed to join the strain gauge to the substrate has a coefficient of thermal expanion of $46 \times 10^{-7}$ centimeters per centimeter per degree centigrade.

My present invention process is predicated upon these unexpected discoveries. Thus, in its broadest definition, this novel process or method comprises the steps of forming a superficial layer of silica on the silicon body prior to coating the body with a boron-containing glass. Further, this method involves applying a coating of borosilicate glass to the silica coating on the silicon body at a temperature from 1000° C. to 1050° C. and then cooling the resulting composite body and freezing the glass coating in place on the said silicon cover.

More in detail, in accordance with the preferred practice of this invention, a silicon body or more specifically in a typical case a strain gauge of silicon is suitably treated for the formation in situ of a layer of silica on the surface of the body to be glass-coated as in preparation for the use of the gauge by attachment through the glass to a test member. Suitably, this coating of silica is formed by heating the silicon body in an oxidizing atmosphere, such as air, until a layer of silica about 3,000 Angstroms thick is established on the silica body surface to be glass-covered. I have found, however, that regardless of the manner in which this silica coating is formed, whether in situ or by separate application of silica suitably applied and bonded as a tight, adhering layer to the silicon body, the boron-diffusing tendency mentioned above will be completely eliminated. Actually, the silica coating however formed may be of a thickness between about 2,000 Angstroms and 10,000 Angstroms with 3,000 Angstroms being preferred since heavier coatings do not provide additional effect in blocking boron diffusion into the silicon substrate and do not otherwise enhance the value or utility of the final article or composite structure. Coatings of less than 2,000 to 2,500 Angstroms, however, will limit boron diffusion but not assuredly prevent it. Consequently, there is no sharply-defined dividing line between totally effective boron-diffusion blocking action and the lack of adequate boron-diffusion blocking for strain gauge purposes. Rather, there is a shading-off in each direction from the preferred silica layer thickness dimension which it will be understood is a substantially uniform thickness dimension across the silica coating to be glass-covered. Variations in the thickness of this coating will preferably not be greater than 1,000 Angstroms. In actual practice, an acceptable coating of silicon has been formed by heating a silicon strain gauge in still air at 1200° C. for about 12 hours.

As stated above, I have found preferable for this strain gauge application a borosilicate glass having a coefficient of thermal expansion of $46 \times 10^{-7}$ centimeters per centimeter per degree centigrade from 25° C. to 300° C. This glass is composed of 67 percent $SiO_2$, 16 percent $B_2O_3$, 3 percent BaO, 7.5 percent $Al_2O_3$, 2.5 percent $Na_2O$ and 1 percent $K_2O+Li_2O$. An alternative to this glass is one having a coefficient of thermal expansion of $36 \times 10^{-7}$ centimeters per centimeter per degree centigrade from 25° C. to 300° C., and composed of 73 percent $SiO_2$, 16.5 percent $B_2O_3$, 6.5 percent PbO and 4.0 percent of $Na_2O+K_2O+Li_2O$.

Whichever of these two glasses or any equivalent suitable borosilicate glass is employed for this strain gauge use or analogous silicon coating purposes it will, as indicated above, be important if not essential to the desired bonding results to carry out the glass coating application operation in a certain temperature range. Thus, whether glass in the form of frit or in block form is employed, it is desirable that the glass be melted in contact with the silica-coated silicon body to be glass-covered at a temperature of from 1000° C. to 1050° C. When this melting operation has been effected, the resulting composite body is cooled quickly to effect freezing of the glass in situ. In fact, I prefer to carry out this glass-coating operation while a small pressure is applied to the substrate, such as a silicon strain gauge. This application of pressure, I have found, tends to reduce somewhat the temperature required to accomplish the glass-coating operation. I have, in fact, obtained good glass coatings on silicon strain gauges in operations otherwise the same as described above except that the firing and fusing of the glass to provide the coating is carried out at 950° C. At that temperature, the tendency toward bubble formation in the glass as a result of the reaction of the glass with the silica or silicon of the strain gauge is substantially completely eliminated.

It will be understood by those skilled in the art that the bonding operations described above are to be carried out only when the substrate is substantially clean and free of dirt which would interfere with adherence of the desired covering or coating material. Consequently, any suitable conventional cleaning method is carried out as a preliminary step to the oxidizing of the silicon body or otherwise forming on the body the boron diffusion-blocking silica coating. Then, if the glass coating is not to be applied promptly to the freshly-prepared silica coating, that coating is protected against contamination by dirt or is cleaned by any suitable method just prior to the glass-coating operation.

Wherever in this specification or in the appended claims amounts, ratios or proportions are stated, reference is made to the weight basis rather than the volume basis.

What I claim as new and desire to secure by Letters Patent of the United States is:

1. The method of making a vapor-tight glass-silicon composite body which comprises the steps of forming a layer of silica about 2,000 to 10,000 Angstroms thick on the surface portion of the silicon body to be glass-coated, forming a coating of a borosilicate glass onto the silica layer on the silicon body at a temperature of from 1,000° C. to 1050° C., and then cooling the resulting composite body and freezing the glass coating in place on the silica-covered silicon body.

2. The method of claim 1 wherein the glass has a coefficient of thermal expansion of $46 \times 10^{-7}$ centimeters per centimeter per degree centigrade.

References Cited

UNITED STATES PATENTS 3,212,929  10/1965  Pliskin et al. _____ 117—169 X

DAVID KLEIN, Primary Examiner

U.S. Cl. X.R.

117—54, 125, 169; 338—2